United States Patent
Benayoun et al.

(10) Patent No.: US 7,240,301 B2
(45) Date of Patent: Jul. 3, 2007

(54) SYSTEM AND METHOD TO INSERT NEW PAGES WITH A SCHEMATIC CAPTURE TOOL

(75) Inventors: Alain Benayoun, Cagnes/Mer (FR); Jean Louis Grillo, Nice (FR)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 10/904,310

(22) Filed: Nov. 3, 2004

(65) Prior Publication Data

US 2006/0098026 A1   May 11, 2006

(30) Foreign Application Priority Data

Dec. 19, 2003   (EP) .................................. 03368116

(51) Int. Cl.
*G06F 17/50*   (2006.01)
*G06K 9/00*   (2006.01)

(52) U.S. Cl. .............................. 716/1; 716/11; 382/113

(58) Field of Classification Search .................... 716/1, 716/11; 345/619, 570; 382/113
See application file for complete search history.

(56) References Cited

U.S. PATENT DOCUMENTS

2002/0018583 A1 *  2/2002  Gont et al. .................. 382/113

* cited by examiner

*Primary Examiner*—Paul Dinh
(74) *Attorney, Agent, or Firm*—Steven Capella

(57) ABSTRACT

A computer implemented method to perform an insertion request of new schematic pages within a plurality of numbered schematic pages created with a design schematic capture tool is described. The method allows a user to insert as much as new pages in a user friendly manner by being implemented in a design schematic capture tool through a Graphical User Interface (GUI). The GUI offers a location field to enter the schematic page number where to insert the new pages, a number field to enter the number of new schematic pages to be inserted, and an execution key to be depressed to execute the insertion operation automatically.

10 Claims, 10 Drawing Sheets

```
****** Top Of File ******
4        2
10       1
****** End Of File ******
```

******* Top Of File ********
page1.csa
page2.csa
page3.csa
page4.csa
page5.csa
page6.csa
page7.csa
page8.csa
page9.csa
page10.csa
******* End Of File ********

FIG. 7A

******* Top Of File ********
page1.csa
page2.csa
page3.csa
page4.csa
Page5.csa     <--- inserted blank page
Page6.csa     <--- inserted blank page
page7.csa
page8.csa
page9.csa
page10.csa
page11.csa
page12.csa
******* End Of File ********

FIG. 7B

******* Top Of File ********
page1.csa
page2.csa
page3.csa
page4.csa
Page5.csa     <--- inserted blank page
Page6.csa     <--- inserted blank page
page7.csa
page8.csa
page9.csa
page10.csa
Page11.csa    <--- inserted blank page
page12.csa
page13.csa
******* End Of File ********

FIG. 7C

\*\*\*\*\*\*\*\*\*\*\* Top Of File \*\*\*\*\*\*\*\*\*\*\*  
Edit subset#1.Sch_1.1.13  
Page forcereset 13  
Write  
Edit subset#1.Sch_1.1.12  
Page forcereset 12  
Write  
Edit subset#1.Sch_1.1.11  
Page forcereset 11  
Write  
Edit subset#1.Sch_1.1.10  
Page forcereset 10  
Write  
Edit subset#1.Sch_1.1.9  
Page forcereset 9  
Write  
Edit subset#1.Sch_1.1.8  
Page forcereset 8  
Write  
Edit subset#1.Sch_1.1.7  
Page forcereset 7  
Write  
Edit subset#1.Sch_1.1.6  
Page forcereset 6  
Write  
Edit subset#1.Sch_1.1.5  
Page forcereset 5  
Write  
Edit subset#1.Sch_1.1.4  
Page forcereset 4  
Write  
Edit subset#1.Sch_1.1.3  
Page forcereset 3  
Write  
Edit subset#1.Sch_1.1.2  
Page forcereset 2  
Write  
Edit subset#1.Sch_1.1.1  
Page forcereset 1  
Write  
\*\*\*\*\*\*\*\*\*\*\* End Of File \*\*\*\*\*\*\*\*\*\*\*

FIG. 8

SYSTEM AND METHOD TO INSERT NEW PAGES WITH A SCHEMATIC CAPTURE TOOL

BACKGROUND OF THE INVENTION

The invention relates in general to design tools used to design printed circuit boards (PCB's) and to generate manufacturing files, and more particularly to a system and method to insert new pages with a schematic capture tool.

Since many years, the conception of electronic boards is performed by using CAO systems. These CAO systems are generally composed of three main subsystem tools: the library tool, the schematics capture tool and the Printed Circuit Board (PCB) tool. Among the most well-known CAO systems, one can list CADSTAR from ZUREN REDAC, ORCAD from CADENCE, MENTOR Architect from MENTOR GRAPHICS and Concept from CADENCE. The present invention addresses the schematics capture tool, and more particularly the CADENCE one.

As illustrated on FIG. 1, the CADENCE PCB design tool is made of the following software products:

a 'PE Librarian Expert' block 100. This is a library where logical and physical models are stored. A user can create any kind of components;

a 'Concept HDL Expert' block 110. This is a schematic editor which allows the user to capture the design schematics. This is the logical design phase;

a 'Packager-XL' block 120. This is a bridge between logical design and physical design; and an 'Allegro Expert' block 130. This is a graphic tool for component placement, signal routing and output files block 140 for manufacturing. This is the physical design phase.

The 'Concept HDL Expert' tool 110 offers a graphic interface to capture an electronic design. This latter is made of several numbered schematic pages which are saved to disk individually.

To insert one new page between a page (i) and a page (j) out of 'N' pages, the current available command requires the user to take the following actions:

(1) Save all pages (j) to (N) as (m+1) pages starting by the end, meaning that current page (N) is saved as new page (N+1), current page (N−1) is saved as new page (N) and so on until page (j) is as page (j+1);
(2) Editing current page (j);
(3) Deleting its content to get the new inserted blank page.

It's easily understandable that this process is long, time consuming and boring for designs made of hundred of pages as is generally the case. Therefore, there is a real need for a method that allows to easily and rapidly insert new schematic pages when using a schematic capture tool.

SUMMARY OF THE INVENTION

The invention provides a method to allow a user of a schematic capture tool to rapidly and easily insert new schematic blank pages.

In another aspect, invention provides a method to insert one or multiple schematic blank pages at one or several insertion locations among the existing schematic sheets.

In another aspect, invention provides the user of a schematic capture tool with an 'Insert New Page' command.

In a preferred embodiment, the computer implemented method to perform an insertion request of new schematic pages within a plurality of numbered schematic pages created with a design schematic capture tool comprises the steps of:

(1) receiving an insertion request from a command area of the design schematic capture tool;
(2) pointing to a numbered schematic page among the plurality of numbered schematic pages;
(3) receiving the information of a number of the at least a new schematic page to be inserted; and
(4) automatically inserting the number of at least a new schematic page after the pointed numbered schematic page.

The method allows a user to insert as much as new pages in a user friendly manner by being implemented in a design schematic capture tool through a Graphical User Interface (GUI). The GUI offers a location field to enter the schematic page number where to insert the new pages, a number field to enter the number of new schematic pages to be inserted, and an execution key to be depressed to execute the insertion operation automatically. The GUI may further offers a validation key to allow the clearing of the location and the number fields in order to enter new data for a second insertion operation.

A program storage device readable by a machine, may be used to tangibly embody a program of instructions executable by a machine that performs the method steps of anyone of claim 7. Similarly, the method steps of anyone of claim 1 may be available as a computer program product.

These and other aspects of the invention are described in further detail below.

A program storage device readable by a machine, may be used to tangibly embody a program of instructions executable by a machine that performs the method steps of the invention. Similarly, the method steps of anyone of the invention may be available as a computer program product.

FIG. 7A to 7C show a current_pages.txt file at each step of the process.

FIG. 8 shows a REFRESH.scr file.

DETAILED DESCRIPTION OF THE INVENTION

All along the present document, the invention is described with reference to the CADENCE tool. The general concepts or functions of this design tool are not developed but only those required for the understanding of the invention.

Figure 1:
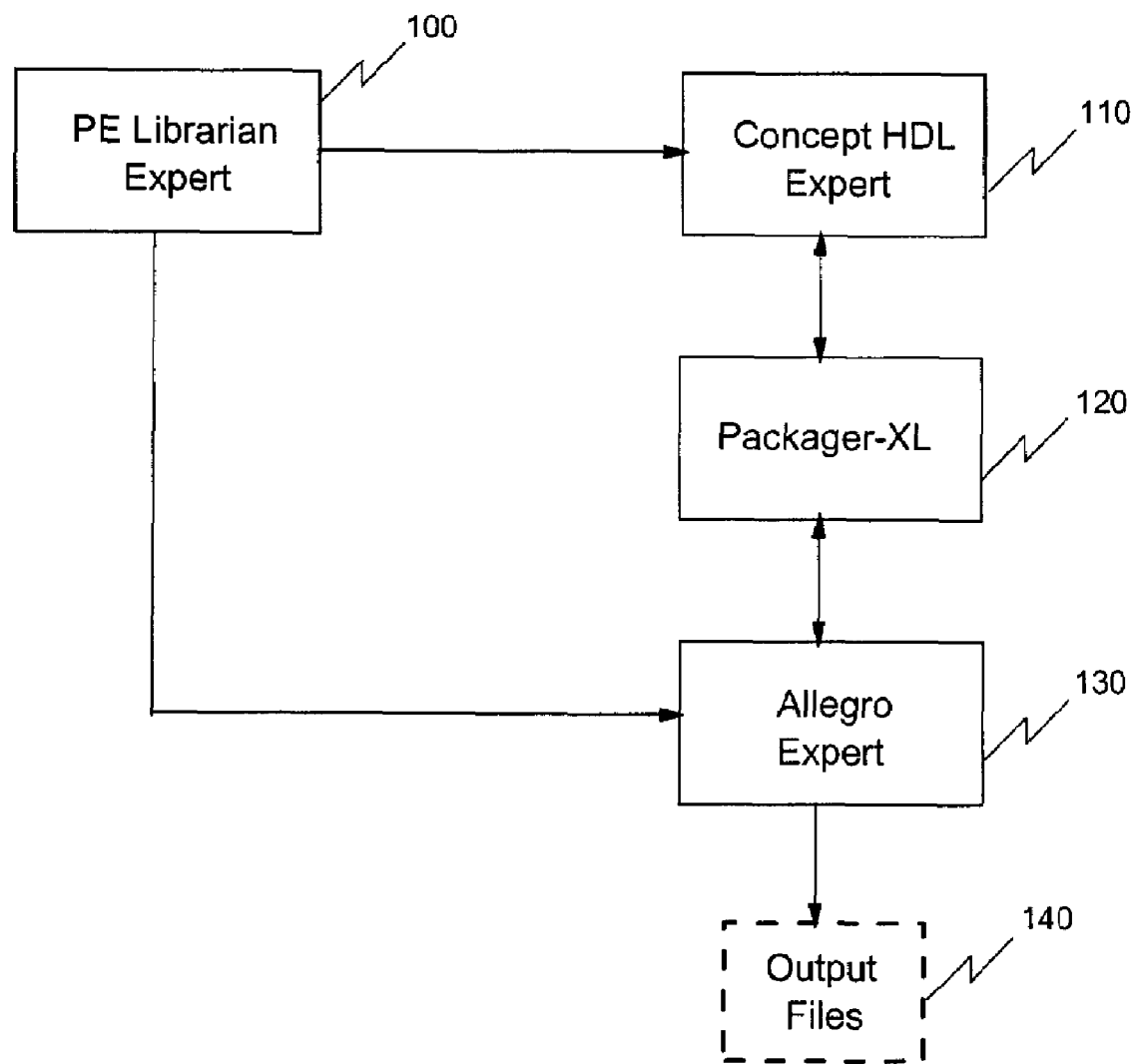
FIG. 1 is a block diagram of the CADENCE Printed Circuit Board design tools.
Figure 2:
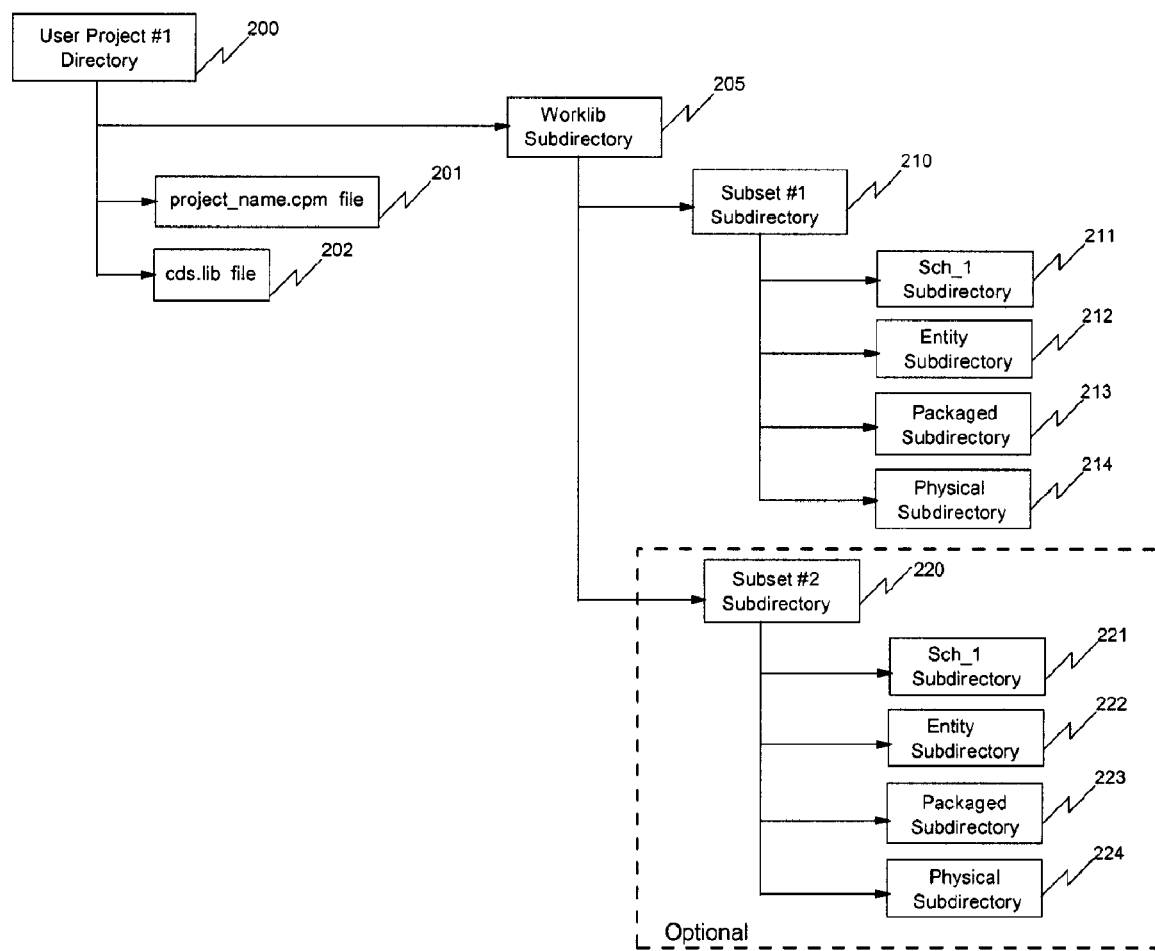
FIG. 2 shows a directory structure for each user project.

Going first to FIG. 2 when a user creates a new project, a directory structure is implemented in a memory of the computer system on which the schematic capture tool runs.

The top directory is the user project directory block 200. It includes a project_name file block 201, a library file block 202 and a worklib sub directory block 205.

The worklib sub directory block 205 includes at least one subset sub directory block 210 or as many as the user desires. A second subset sub directory block 220 is given as an example on FIG. 2 without limiting the number of sub directories to be included. These subset sub directories allow the user to split his design by functions such as power design, clock design and microprocessor design.

The subset sub directory block 210 includes four sub directories:
- a Sch_1 sub directory block 211 which contains the schematic pages;
- an Entity sub directory block 212 which contains an HDL description of the subset sub directory block 210;
- a Packaged sub directory block 213 which contains the packaging results;
- a Physical sub directory block 214 which contains the PCB layout.

Figure 3:
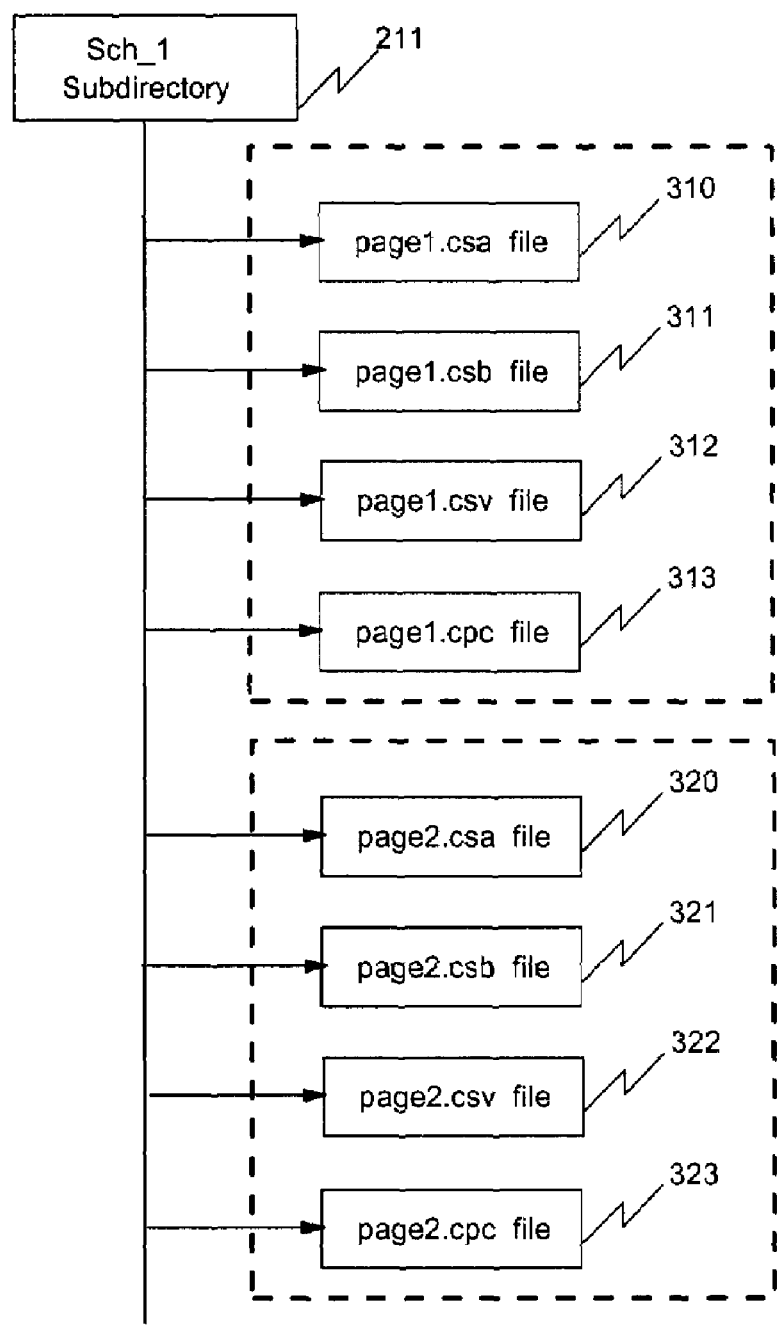
FIG. 3 shows a schematic sub directory.

Referring now to FIG. 3, a detailed view of the schematic pages sub directory block 211 is now described. When the user saves a schematic page, the information is stored in the Sch_1 sub directory block 211. Each page of the design is saved to disk individually under four different files:
- a page1.csa file block 310 which is an ASCII representation file for page 1;
- a page1.csb file block 311 which is a binary representation file for page 1;
- a page1.csv file block 312 which is an ASCII connectivity file for page 1;
- a page1.cpc file block 313 which is a Concept Parent Child file.

It is important to mention that when the user works on a schematic page, only the csa file is used. The three other files (csb, csv and cpc) are created by the Concept HDL Expert for another usage than the schematic capture, when the user saves the schematic page.

The invention is to be operated as an executable program file hereby named INSERT. It may preferably runs on any workstation that supports either the UNIX (UNIX is a trademark of The Open Group) or the LINUX operating systems. This executable program file has to be stored within the subset sub directory block 210 and run from there. In the same directory a blank_page.csa file is created.

When a user needs to insert new schematic pages, the following actions are performed:
(1) Closing the Concept HDL Expert tool;
(2) Entering an insertion request in a command area with a command of the type:
 /user_project#1/worklib/subset#1/INSERT A flow chart of the method that is then operated is now described from FIG. 4A to FIG. 4D. The method starts on step 400 with the user being proposed with a graphical user interface (GUI) displayed on a screen of the user's computer system, next after the user has entered the insertion command. Such example of an insertion GUI is illustrated on FIG. 5 which shows the main components (500,510,520, 530,540) to allow the user to perform easily and rapidly the insertion operation.

When the GUI is displayed, the user then performs the following actions:
(1) Entering in a location field (500) the page number after which the new schematic page(s) will be inserted;
(2) Entering in a number field (510) the number of pages to be inserted;
(3) Selecting the OK key (520) to validate the entries.

As a consequence, the two fields 500 and 510 are cleared. Then the user may repeat steps a,b,c as many times as necessary to indicate new locations where to insert new pages. When finished, the user selects the EXECUTE key (530) to perform the complete insertion process.

For the ease of description, let's assume that the user has already written a total of ten schematic pages. Then he wants to insert two new blank pages after page four and one new blank page after page eight. This example will be kept for all the description but it is appreciated that it is only for a purpose of understanding and not to limit the scope of the invention.

On step 400, the user interface is displayed on the screen. On step 405, the user enters the number '4' in the field 500 and the number '2' in the field 510. Then he depresses the OK key 520 on step 410. On step 415, the content of the two fields are saved into two variables referenced as 'parameter_11' and 'parameter_12' and the two fields (500, 510) are cleared to acknowledge the user of their validation. On next step 420, the process either jumps back to step 405 to get another insertion request (branch No) or goes to step 425 to execute the command (branch Yes). In the present example, the user enters a second insertion request with the number '8' in field 500 and the number '1' in field 510. The content of the two fields are saved into two variables named 'parameter_21' and 'parameter_22' on step 410 followed by depressing the EXECUTE key 530.

On next step 425, several working tools are created:
- first a temporary directory (tmp) is created to save all relevant files for the INSERT executable program file; and
- a user_parameters.txt file is created. This file is organised as a succession of lines, each line being a user insertion request. The first line is unique pointing to the first insertion request. A first number represents the insertion page number (the parameter 'parameter_11') and a second number represents the number of inserted pages (the parameter 'parameter_12'). From the second line and for each next ones, a first number represents the sum of the insertion page number relative to the corresponding user request plus the previous numbers of inserted pages. A second number still represents the number of inserted pages for the corresponding user request. For example, for line (j) with j>1, the following formulae apply:

first number=parameter_$j$1+sum ($i$=1 to $j$−1) parameter_$i$2 second number=(j) number of inserted pages

Figures 5, 6:
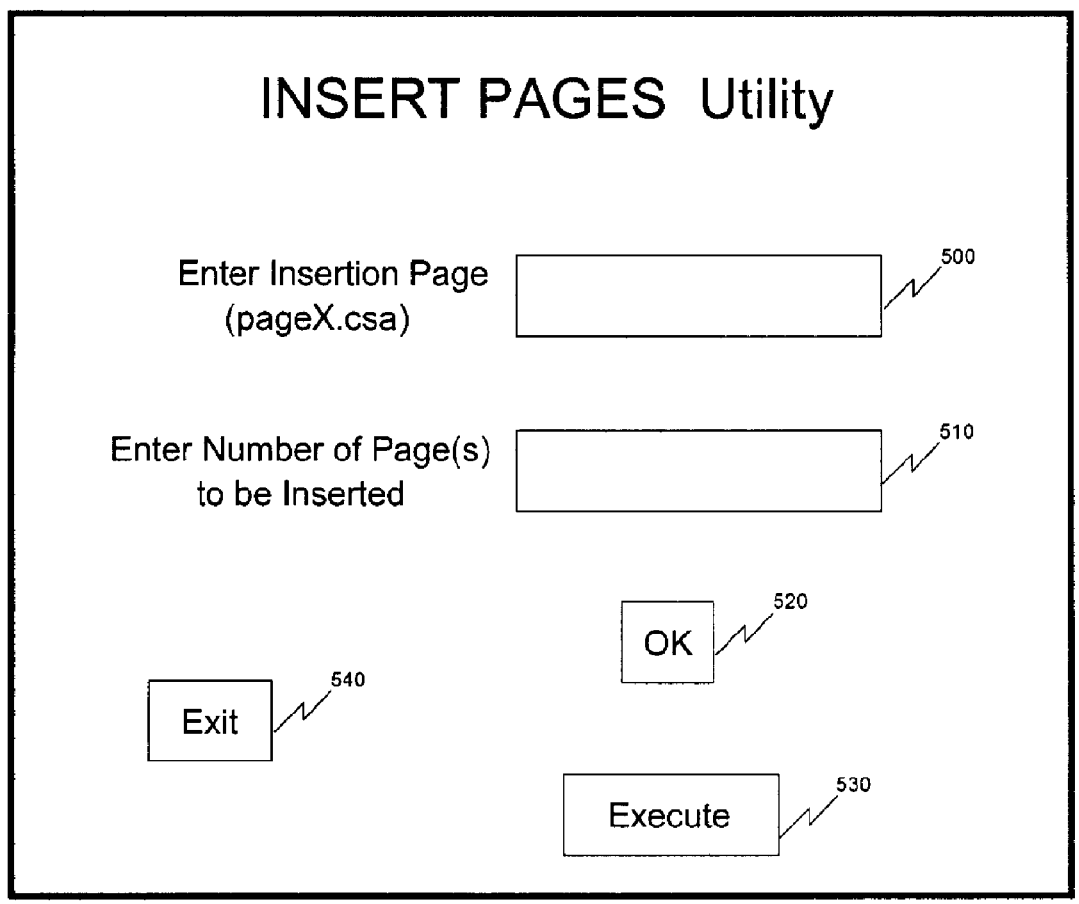
FIG. 5 is an illustration of a user interface embodying the present invention.

The format of the user_parameters.txt file is shown on FIG. 6 with the parameters used in the previously described example. It is to be noted that it is not relevant to the invention how this file is built.

Figure 4A:
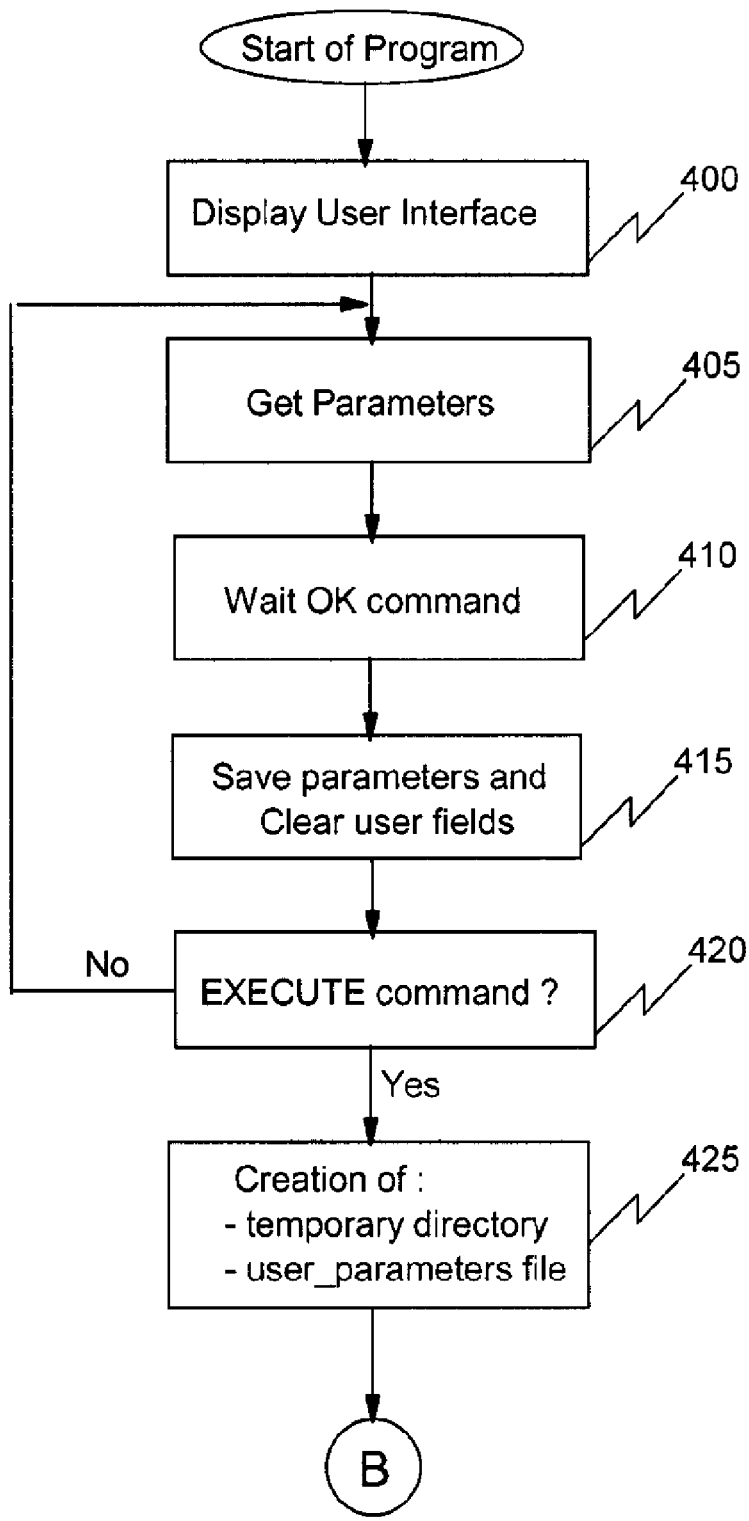
FIG. 4A to 4D show a flow chart of the executable program file. The main program is described from FIG. 4A to FIG. 4B and the subroutine is described on FIG. 4D.
Figure 4B:
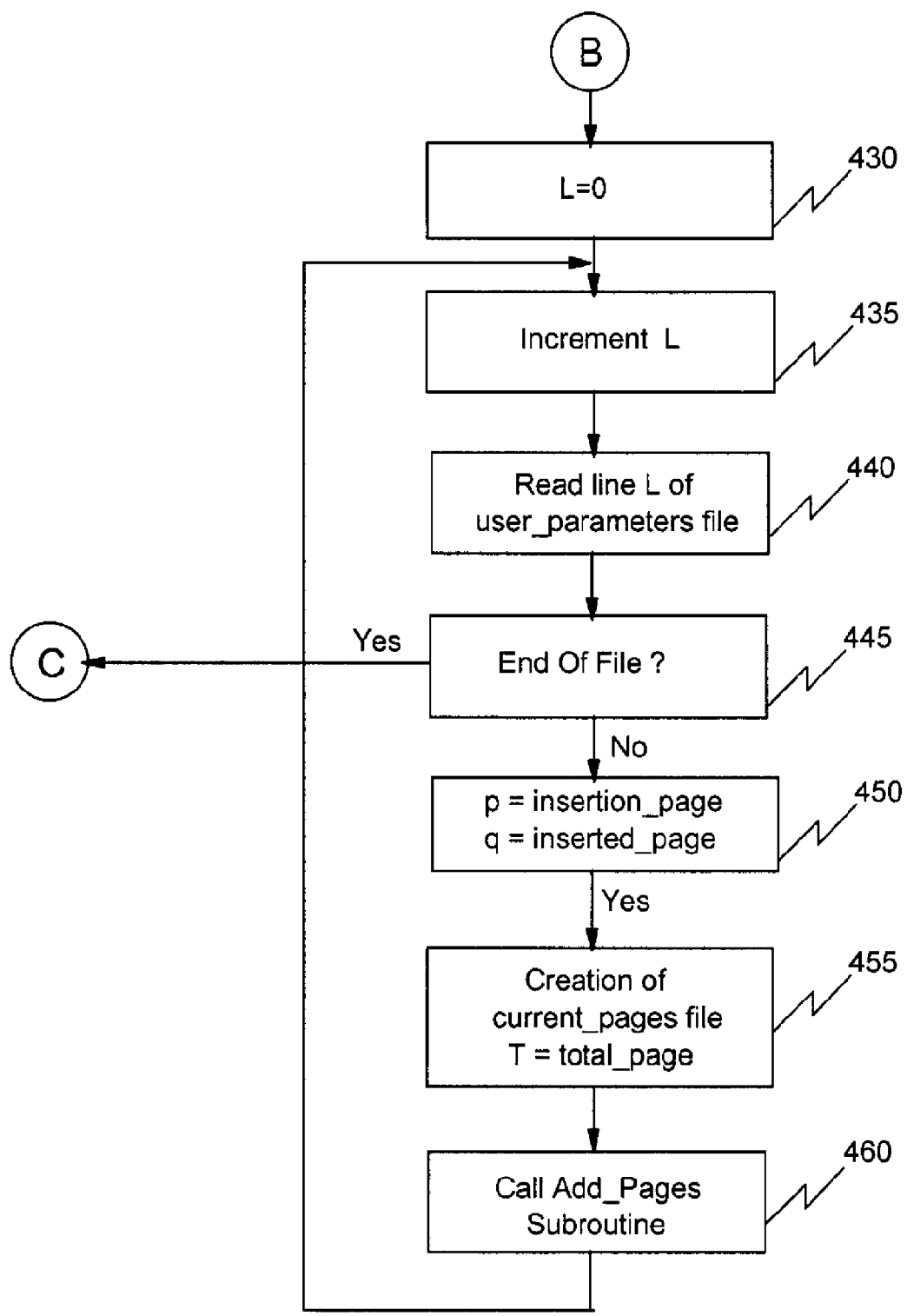

Going to FIG. 4B, the process follows with step 430 where a variable 'L' is created and initialized to zero. This variable is used to count a number of lines. The next step 435 is the beginning of a loop which runs as long as step 445 is not ended, which is three times in the present example.

1. Description of Run#1:

On step 435, the 'L' variable is incremented. The content of line 'L' in the user_parameters.txt file is read on step 440 and analysed on step 445.

As illustrated in FIG. 6, the first line is an insertion request and therefore the program jumps to step 450 where the insertion page number '4' is saved in a variable 'p' and the number of inserted pages '2' is saved in a variable 'q'.

On step 455, a current_pages.txt file is created. This file contains the list of current csa files. As exemplified on FIG. 7A, there are ten files and this number '10' is saved in a variable 'T'.

Figure 4C:
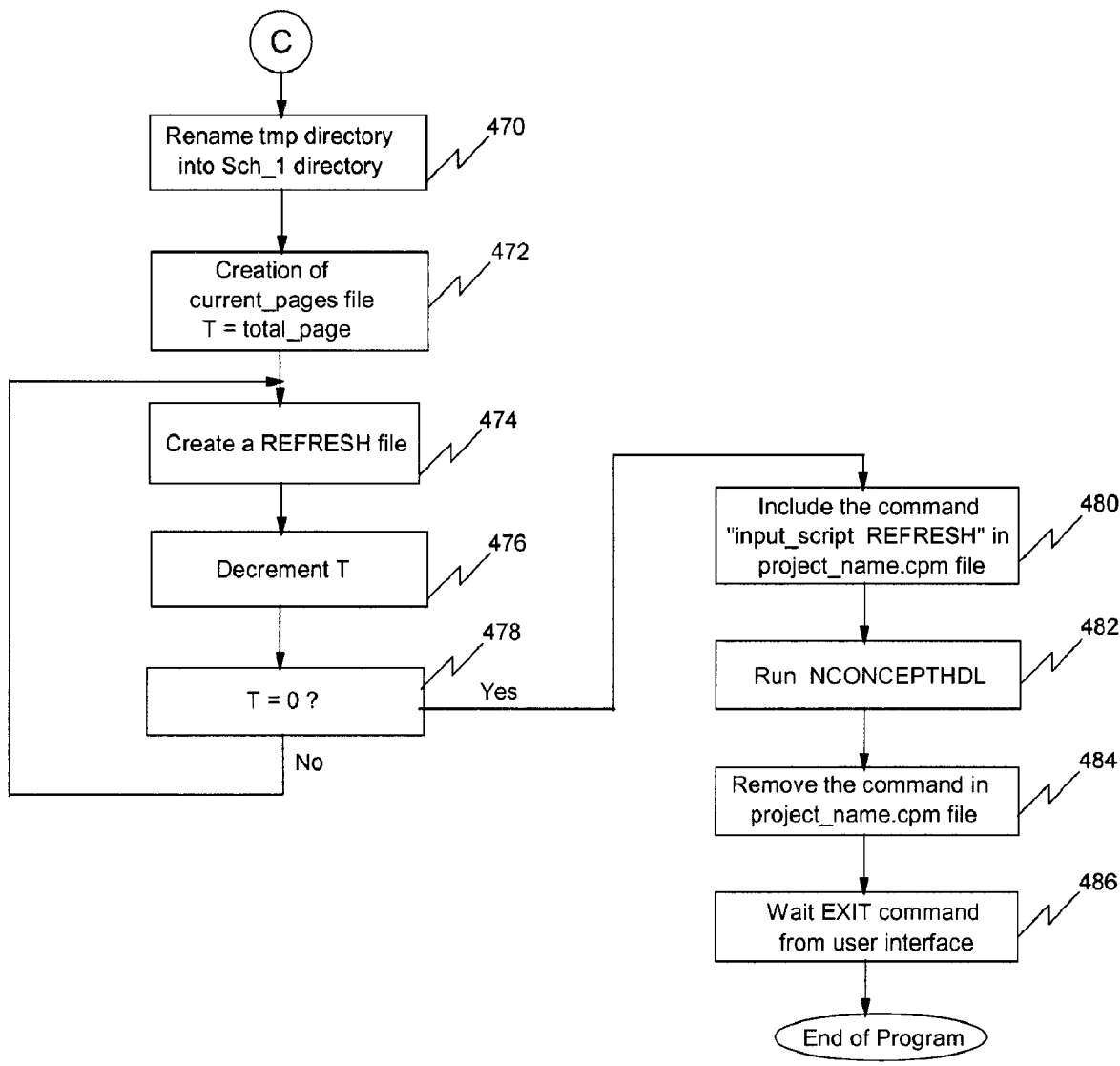
Figure 4D:
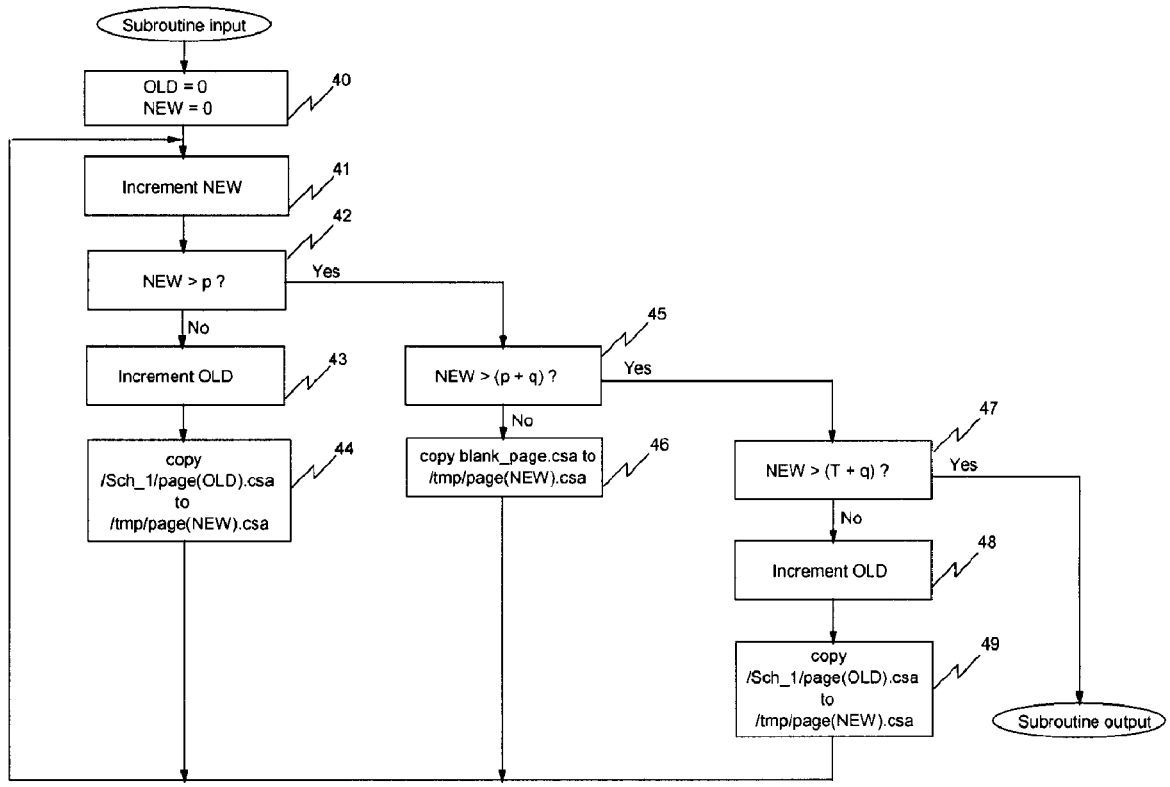

On step 460, all the variables being defined, the main process calls a add_pages subroutine which is now described in conjunction with FIG. 4D.

On step 40, two variables (OLD,NEW) are created and initialized to zero. The 'OLD' variable counts the existing pages and the 'NEW' variable counts the new ordering. A loop starts on step 41 where the 'NEW' variable is incremented. Four cases are to be considered:

Case #1: from NEW=1 to NEW=p

The 'NEW' variable is lower or equal to the insertion page number. Therefore, on step 42, the process jumps to step 43 where the 'OLD' variable is incremented. Then the existing page is copied into the temporary directory on step 44 and the process returns to step 41 to increment the 'NEW' variable.

Case #2: from NEW=(p+1) to NEW=(p+q)

In this case, the 'NEW' variable is greater than the insertion page number (step 42), and the process jumps to step 45. Step 45 checks that the 'NEW' variable is lower or equal to the insertion page number added with the number of inserted pages, and the process goes to step 46 where a blank page is copied into the temporary directory. Then the program returns to step 41 to increment the 'NEW' variable.

Case #3: from NEW=(p+q+1) to NEW=(T+q)

In this case, the 'NEW' variable is greater than the insertion page number (step 42), and the process jumps to step 45. Step 45 checks that the 'NEW' variable is greater than the insertion page number added with the number of inserted pages, and the process goes to step 47. Step 47 checks that the 'NEW' variable is lower or equal to the total page number added with the number of inserted pages, and the process jumps to step 48 where the 'OLD' variable is incremented. On step 49, the existing page is copied into the temporary directory. Then the program returns to step 41 to increment the 'NEW' variable;

Case #4: NEW=(T+q+1)

The program jumps from step 42 to step 45 then to step 47 where it exits the subroutine to return to step 435.

2. Description of Run#2:

On step 435 of FIG. 4B, the variable 'L' is incremented. The content of line 'L' in the user_parameters.txt file is read on step 440 and analysed on step 445.

As illustrated in FIG. 6, the second line is an insertion request and therefore the program jumps to step 450 where the insertion page number '10' is saved in a variable 'p' and the number of inserted pages '1' is saved in a variable 'q'.

On step 455, a current_pages.txt file is created. This file contains the list of current csa files. As illustrated on FIG. 7B, there are now twelve files and this number is saved in a variable 'T'.

On step 460, all the variables being defined, the main process calls the add_pages subroutine (FIG. 4D). The subroutine inserts one blank page after page numbered '10' and the program returns to step 435.

3. Description of Run#3:

On step 435 of FIG. 4B, the 'L' variable is incremented. The content of line 'L' in the user_parameters.txt file is read on step 440 and analysed On step 445. As illustrated in FIG. 6, the third line is the 'End of file' line and therefore the process goes to step 470 (FIG. 4C).

At this stage, the user insertion requests have been processed and the new csa files are stored into the temporary directory (tmp). The last operation consists of generating the complementary files. This process is illustrated on FIG. 4C.

On step 470, the temporary directory (tmp) is renamed as the main directory (Sch_1). On next step 472, a current_pages.txt file is created. This file contains the list of csa files. As illustrated on FIG. 7C, there are now thirteen files and this number is saved in a variable 'T'.

The next steps (474,476,478) are executed in a loop until the 'T' variable is equal to zero. This loop creates a REFRESH script file as illustrated on FIG. 8. This file contains thirteen times a group of three Concept commands. Therefore, for each schematic page, the first command edits the schematic page, the second command modifies the page number located inside the schematic page at a defined location and the third command saves the new csa file and automatically creates the additional files (csb, csv and cpc). It is not relevant to the invention to describe how these files are built.

On step 480, the command "input_script REFRESH" is added in the project_name.cpm file. This file is a project initialisation file called by Concept at launch time.

On step 482, the NCONCEPTHDL command allows to run the Concept tool as a background task meaning that the user does not see it. When loaded, Concept executes the command listed in the project_name.cpm file and more specifically the "input_script REFRESH".

When this task is completed the process goes to step 484 where the command "input_script REFRESH" is removed from the project_name.cpm file.

And then, on step 486 when the user depresses the exit key 540 from the user interface, the program INSERT ends.

What is claimed is:

1. A computer implemented method to perform an insertion request of at least a new schematic page within a plurality of numbered schematic pages created with a design schematic capture tool, comprising the steps of:
   (a) receiving an insertion request from a command area of the design schematic capture tool;
   (b) pointing to a numbered schematic page among the plurality of numbered schematic pages;
   (c) receiving information of a number of the at least a new schematic page to be inserted; and
   (d) automatically inserting the number of the at least a new schematic page after the pointed numbered schematic page.

2. The method of claim 1 wherein step (b) comprises a step of entering a schematic page number in a location field of a Graphical User Interface (GUI).

3. The method of claim 2 wherein step (c) comprises a step of entering information of a number of the at least a new schematic page to be inserted in a number field of the GUI.

4. The method of claim 2 wherein step (b) further comprising the step of storing the schematic page number.

5. The method of claim 4 further comprising the step of renumbering the plurality of schematic pages.

6. The method of claim 5 wherein step (d) further comprises the step of executing a subroutine program stored in a sub directory associated to a directory created for the plurality of numbered schematic pages.

7. The method of claim 6 further comprising before step (d) the step of repeating steps (b) and (c) for a new numbered schematic page.

8. A design schematic capture tool comprising means to operate the method steps of claim 1.

9. A program storage device readable by a machine, tangibly embodying a program of instructions executable by a machine to perform the method steps of claim 1.

10. A computer program product in a computer readable medium on which is provided program instructions for enabling a computer to perform an insertion request of at least a new schematic page among a plurality of numbered schematic pages created with a design schematic capture tool according to the method steps of claim 1.

\* \* \* \* \*